UNITED STATES PATENT OFFICE.

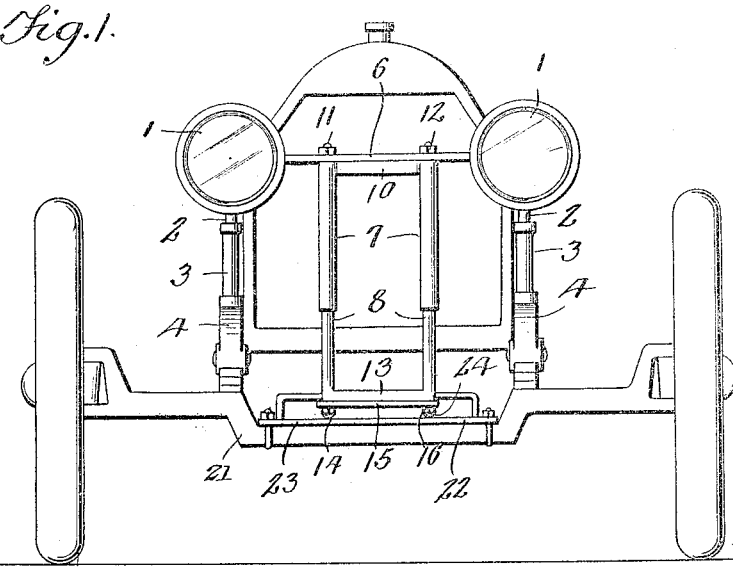
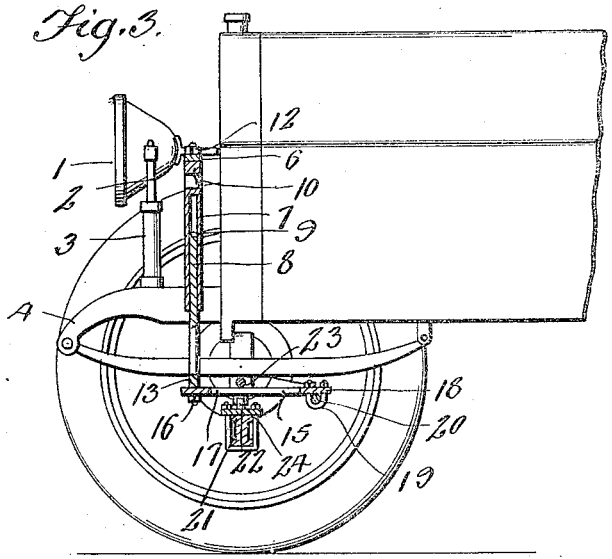

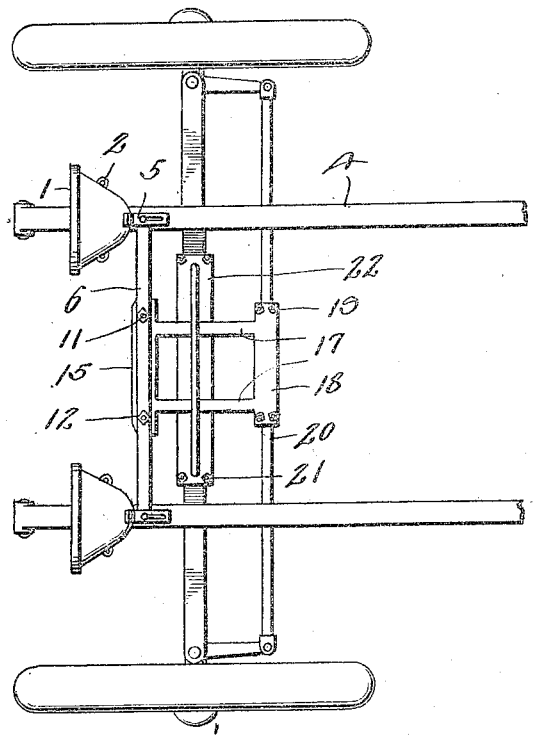
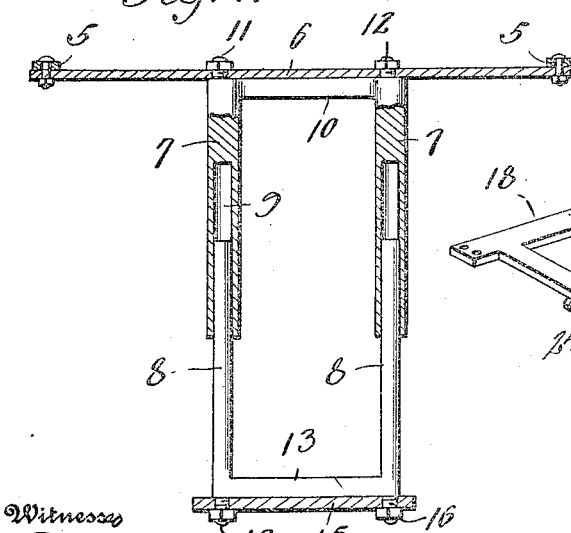
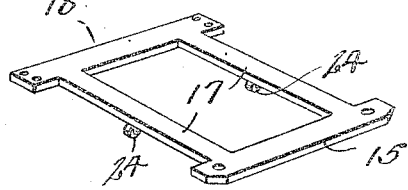

JAMES M. HEADEN, OF HAMER, SOUTH CAROLINA.

DIRIGIBLE HEAD-LAMP.

1,213,635.

Specification of Letters Patent.

Patented Jan. 23, 1917.

Application filed October 25, 1916. Serial No. 127,651.

*To all whom it may concern:*

Be it known that I, JAMES M. HEADEN, a citizen of the United States, residing at Hamer, in the county of Dillon and State of South Carolina, have invented new and useful Improvements in Dirigible Head-Lamps, of which the following is a specification.

This invention relates to dirigible head-lamps, the broad object of the invention being to provide lamp turning mechanism having a novel relation to one of the steering elements of a motor vehicle whereby the head lamps are turned in accordance with the angles assumed by the steering wheels of the machine so that the rays of light from the head lamps will be projected upon the road way in the direction to be taken thereby thus eliminating many of the serious accidents which now occur by reason of the fact that the rays of light are thrown straight ahead or in line with the longitudinal axis of the machine irrespective of the angles assumed by the steering wheels in making a turn.

With the above and other objects in view the invention consists in the novel construction, combination and arrangement of parts, herein described, illustrated and claimed.

In the accompanying drawings:—Figure 1 is a front elevation of an automobile showing the dirigible head lamp mechanism in its applied relation thereto. Fig. 2 is a plan view of the same. Fig. 3 is a vertical longitudinal section thereof. Fig. 4 is a vertical transverse section through the same, in line with the telescopic posts. Fig. 5 is a detail perspective view of the cross head or yoke.

Referring to the drawings 1 designates a pair of head-lamps each of which is mounted on a vertical lamp post 2 journaled to turn in one of a pair of bearing brackets 3 secured fixedly to the frame 4 of the vehicle.

Each of the lamps is provided at the rear side thereof with a backwardly extending arm 5, the arms of both lamps being connected by a coupling rod 6 so that when said rod is moved longitudinally in either direction, both of the lamps are correspondingly turned in the same direction. The means for operating the coupling rod 6 comprises a pair of substantially vertical posts each comprising an upper post section 7 and a lower post section 8. Each upper post section is of tubular formation or provided with a longitudinal bore 9 open at the bottom end of the section 7 and adapted to receive the upper end portion of the respective lower post section 8 thus producing a telescopic action between the upper and lower sections of the posts. The upper sections 7 are rigidly connected together by a cross bar 10 which lies directly under and bears against the coupling rod 6. The upper ends of the sections 7 are reduced as shown at 11 and inserted through holes in the coupling rod 6 and threaded to receive nuts 12 which bear against the upper sides of the rod 6.

The lower sections 8 of the posts are rigidly connected together and braced by means of a cross bar 13 and the lower ends of the sections 8 are reduced as shown at 14 and inserted through holes in a cross head or yoke 15, being secured in place in relation thereto by means of nuts 16. Extending rearwardly from the cross head 15 and forming parts of the yoke are substantially parallel bars 17 fixedly connected at their rear extremities to an attaching bar 18 which is fastened by means of clamps 19 to the connecting rod 20 which extends between the arms of the steering knuckles of the vehicle. Fixedly secured to the front axle by means of clamps 21 is a guide 22 formed with a slot 23 to receive the parallel bars 17. In this way the lamp actuating member consisting of the parts 15, 18, and 22 is supported in a substantially horizontal position and the front end thereof is prevented from dropping downwardly, the sections 7 and 8 of the posts being thus held in working relation to each other at all times while admitting of the relative up and down movement between the body and front axle due to the action of the vehicle body supporting springs.

When the driver of the vehicle turns the steering wheels of the machine, the rod which connects the arms of the steering knuckles is moved substantially in the direction of its length, carrying with it the member 18 and also shifting the cross head 15 in the same direction. Thus a corresponding movement is imparted to the posts which connect the cross head 15 with the coupling rod 6 and as the latter is shifted substantially in the direction of its length, both of the headlamps 1 are given a corresponding turning movement in the same direction thereby directing the rays of light from the lamps upon the road surface to that side to which the steering wheels have been turned. The movement of the body of the vehicle in relation to the wheel base is taken care of by the telescopic action of the posts 7, 8, thus preventing injury to the lamp turning mechanism.

Rollers 24 are mounted under and carried by the bars 17 so as to roll in contact with the base of the guide 22 for the purpose of relieving friction at this point and enabling the whole device to operate at greater ease and less wear.

I claim:—

The combination with a pair of headlamps mounted to turn on substantially vertical axes, of arms extending rearwardly from said lamps, a coupling rod connecting said arms and serving to equalize the turning movement of the lamps, a lamp actuating member comprising a base, clamping means securing said base to the steering arm connected rod, substantially parallel bars extending from said base, a cross head at right angles to said bars and parallel to said base, a slotted guide fastened to the front axle and acting as guiding and supporting means for the lamp actuating member, a plurality of post sections extending upwardly from said cross head, and complemental post sections fixedly attached to said coupling rod and having tubular lower portions which slidingly receive the lower sections of said posts.

In testimony whereof I affix my signature.

JAMES M. HEADEN.

Copies of this patent may be obtained for five cents each, by addressing the "Commissioner of Patents, Washington, D. C."